US009474077B2

(12) United States Patent
Kurihara (10) Patent No.: US 9,474,077 B2
(45) Date of Patent: Oct. 18, 2016

(54) MOBILE COMMUNICATION SYSTEM AND MOBILE COMMUNICATION METHOD

(71) Applicant: NEC Corporation, Tokyo (JP)

(72) Inventor: Nobumasa Kurihara, Saitama (JP)

(73) Assignee: NEC Corporation, Toyko (JP)

( * ) Notice: Subject to any disclaimer, the term of this patent is extended or adjusted under 35 U.S.C. 154(b) by 0 days.

(21) Appl. No.: 14/408,384

(22) PCT Filed: Jun. 18, 2013

(86) PCT No.: PCT/JP2013/066749
§ 371 (c)(1),
(2) Date: Dec. 16, 2014

(87) PCT Pub. No.: WO2013/191182
PCT Pub. Date: Dec. 27, 2013

(65) Prior Publication Data
US 2015/0181605 A1 Jun. 25, 2015

(30) Foreign Application Priority Data

Jun. 20, 2012 (JP) .................................. 2012-138503

(51) Int. Cl.
*H04W 72/04* (2009.01)
*H04W 28/08* (2009.01)
(Continued)

(52) U.S. Cl.
CPC ......... *H04W 72/0486* (2013.01); *H04W 16/00* (2013.01); *H04W 16/04* (2013.01); *H04W 16/08* (2013.01); *H04W 24/02* (2013.01); *H04W 28/085* (2013.01); *H04W 88/08* (2013.01)

(58) Field of Classification Search
CPC ... H04W 24/02; H04W 16/18; H04W 28/08; H04W 16/00; H04W 16/08; H04W 16/10; H04W 16/22; H04W 16/04; H04W 28/0289; H04W 72/0486; H04L 41/145; H04L 41/147; H04L 41/5025; H04L 67/1002; H04L 67/10; G06F 9/505
See application file for complete search history.

(56) References Cited

U.S. PATENT DOCUMENTS 5,828,961 A * 10/1998 Subramamian ....... H04W 16/18
455/446
6,097,951 A * 8/2000 Ernam .................. H04W 28/08
455/433

(Continued)

FOREIGN PATENT DOCUMENTS

JP 2007-166353 A 6/2007
JP 2009-141826 A 6/2009

(Continued)

OTHER PUBLICATIONS

International Search Report corresponding to PCT/JP2013/066749, dated Aug. 20, 2013 (3 pages).

(Continued)

*Primary Examiner* — Matthew Sams
(74) *Attorney, Agent, or Firm* — WIlmer Cutler Pickering Hale and Dorr LLP (57) ABSTRACT

Each of a plurality of first radio units are installed in a plurality of first cells making up a first area, each of a plurality of second radio units are installed in a plurality of second cells making up a second area being separated from the first area, a first radio control unit is constantly connected to a plurality of the first radio units that serve about half of traffic peak in the first area and constantly connected to a plurality of the second radio units that serve about half of traffic peak in the second area, a second radio control unit is constantly connected to the remaining plurality of the first radio units and constantly connected to the remaining plurality of the second radio units, and an upper controller is connected to the first radio control unit and the second radio control unit.

4 Claims, 8 Drawing Sheets

(51) Int. Cl.
*H04W 16/00* (2009.01)
*H04W 24/02* (2009.01)
*H04W 88/08* (2009.01)
*H04W 16/04* (2009.01)
*H04W 16/08* (2009.01)

(56) References Cited

U.S. PATENT DOCUMENTS

| | | | | |
|---|---|---|---|---|
| 6,823,295 B2* | 11/2004 | Bauer | .................... | H04W 24/02 455/433 |
| 6,888,822 B2* | 5/2005 | Svensson | .............. | H04W 60/02 370/353 |
| 7,515,912 B2* | 4/2009 | Chen | .................... | H04W 16/00 455/435.2 |
| 2001/0051859 A1* | 12/2001 | Bauer | .................... | H04W 24/02 703/2 |
| 2003/0166402 A1* | 9/2003 | Svensson | .............. | H04W 60/02 455/434 |
| 2004/0185858 A1* | 9/2004 | Fattouch | ............... | H04W 16/18 455/446 |
| 2008/0242298 A1* | 10/2008 | Nylander | .............. | H04W 16/32 455/435.2 |
| 2009/0323530 A1* | 12/2009 | Trigui | ................ | H04L 41/5025 370/235 |
| 2010/0316010 A1* | 12/2010 | Goldhamer | ........... | H04W 16/10 370/329 |
| 2012/0155859 A1* | 6/2012 | Kakadia | ............... | H04L 41/145 398/25 |
| 2014/0031006 A1* | 1/2014 | Moore | .................. | H04W 24/02 455/405 |
| 2014/0293784 A1* | 10/2014 | Haberland | ............ | H04W 28/08 370/235 |
| 2015/0181605 A1* | 6/2015 | Kurihara | ............... | H04W 16/00 455/453 |

FOREIGN PATENT DOCUMENTS

JP 2011-176517 A 9/2011
JP 2012-100249 A 5/2012

OTHER PUBLICATIONS

Extended European Search Report corresponding to European Application No. 13806207.0, dated Feb. 9, 2016, 7 pages.

* cited by examiner

MOBILE COMMUNICATION SYSTEM AND MOBILE COMMUNICATION METHOD

CROSS-REFERENCE TO RELATED APPLICATIONS

This application is a national stage application of International Application No. PCT/JP2013/066749 entitled "Mobile Communication System and Mobile Communication Method," filed on Jun. 18, 2013, which claims the benefit of the priority of Japanese Patent Application No. 2012-138503, filed on Jun. 20, 2012, the disclosures of each of which are hereby incorporated by reference in their entirety.

TECHNICAL FIELD

The present invention relates to a mobile communication system and a mobile communication method.

BACKGROUND ART

One of mobile communication system installation schemes is a small-zone system. In the small-zone system, one service area is covered by a plurality of small zones. Here, a zone is a range in which radio waves emitted from an antenna can be received. A small zone is also called a cell.

Each of the plurality of cells is provided with a radio device and an antenna. Moreover, two or more radio devices are connected to an upper controller.

A fixed region is set up as a service range of the service area. Accordingly, there are cases where characteristics are different for each service area.

For example, a service area including a residential district is characterized by high traffic in the time period from evening to night. A service area including a business district is characterized by high traffic in the daytime.

Resources sufficient to handle traffic in the time period during which traffic peaks need to be provided to each service area. This has caused a problem that the resources could be excessive for a time period in which traffic is low.

One example of a system that addresses the problem is described in PTL 1. In a mobile communication system described in PTL 1, resources are shared among different service areas according to changes in traffic with time. In the mobile communication system, the antenna of each cell is selectively connected to one of a plurality of the upper controllers on a sector-by-sector basis according to the amounts of traffic. In that case, each upper controller is connected to antennas of the cells across a plurality of service areas. Therefore, even when there are differences in traffic among the service areas, differences in traffic depending on time among the controllers can be reduced.

In the mobile communication system described in PTL 1, resources of a plurality of the upper controllers can be shared among a plurality of service areas. Accordingly, resources may be provided according to the total amount of traffic in the plurality of service areas, rather than providing resources of the upper controllers according to traffic peak in each service area. Accordingly, sharing the resources among a plurality of service areas having different traffic peak times can reduce the resources that need to be provided in the upper controllers, as compared with providing an upper controller for each service area.

CITATION LIST

Patent Literature

[PTL 1] Japanese Laid-open Patent Publication No. 2007-166353

SUMMARY OF INVENTION

Technical Problem

However, the mobile communication system described in PTL 1 dynamically changes connections among the antennas of the cells and the upper controllers. Accordingly, the mobile communication system has a problem that a configuration for dynamically changing connections is required, which adds to configuration complexity.

The present invention has been made in light of the circumstances described above and it is an object of the present invention to provide a mobile communication system and a mobile communication method that are capable of solving the problem described above.

Solution to Problem

To solve the problem, the present invention provides a mobile communication system including a plurality of first radio units, each being installed in a plurality of first cells making up a first area, a plurality of second radio units, each being installed in a plurality of second cells making up a second area being separated from the first area, a first radio control unit constantly connected to a plurality of the first radio units that serve about half of traffic peak in the first area and constantly connected to a plurality of the second radio units that serve about half of traffic peak in the second area, a second radio control unit constantly connected to the remaining plurality of the first radio units and constantly connected to the remaining plurality of the second radio units, and an upper controller connected to the first radio control unit and the second radio control unit.

The present invention also provides a mobile communication method including, installing each of a plurality of first radio units in a plurality of first cells making up a first area; installing each of a plurality of second radio units in a plurality of second cells making up a second area being separated from the first area, enabling a first radio control unit to be constantly connected to a plurality of the first radio units that serve about half of traffic peak in the first area and to be constantly connected to a plurality of the second radio units that serve about half of traffic peak in the second area, enabling a second radio control unit to be constantly connected to the remaining plurality of the first radio units and to be constantly connected to the remaining plurality of the second radio units, and connecting an upper controller to the first radio control unit and the second radio control unit.

Advantageous Effects of Invention

According to the present invention, resources on an upper controller can be appropriately allocated by using a simple configuration even when there are differences in traffic among areas.

DESCRIPTION OF EMBODIMENTS

An embodiment of a mobile communication system according to the present invention will be described below.

Figure 2:
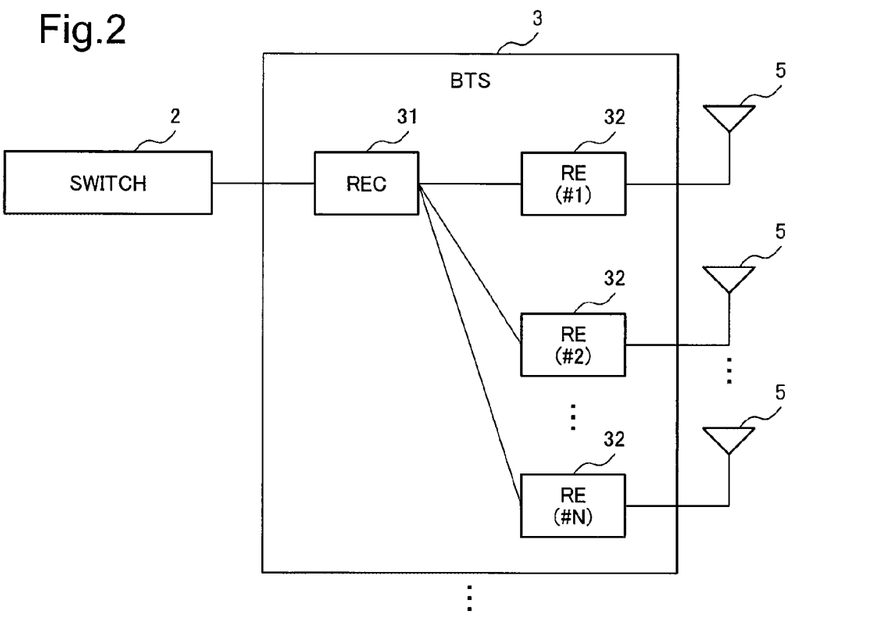
FIG. 2 is a block diagram illustrating an internal configuration of a BTS 3 in FIG. 1.
Figure 3:
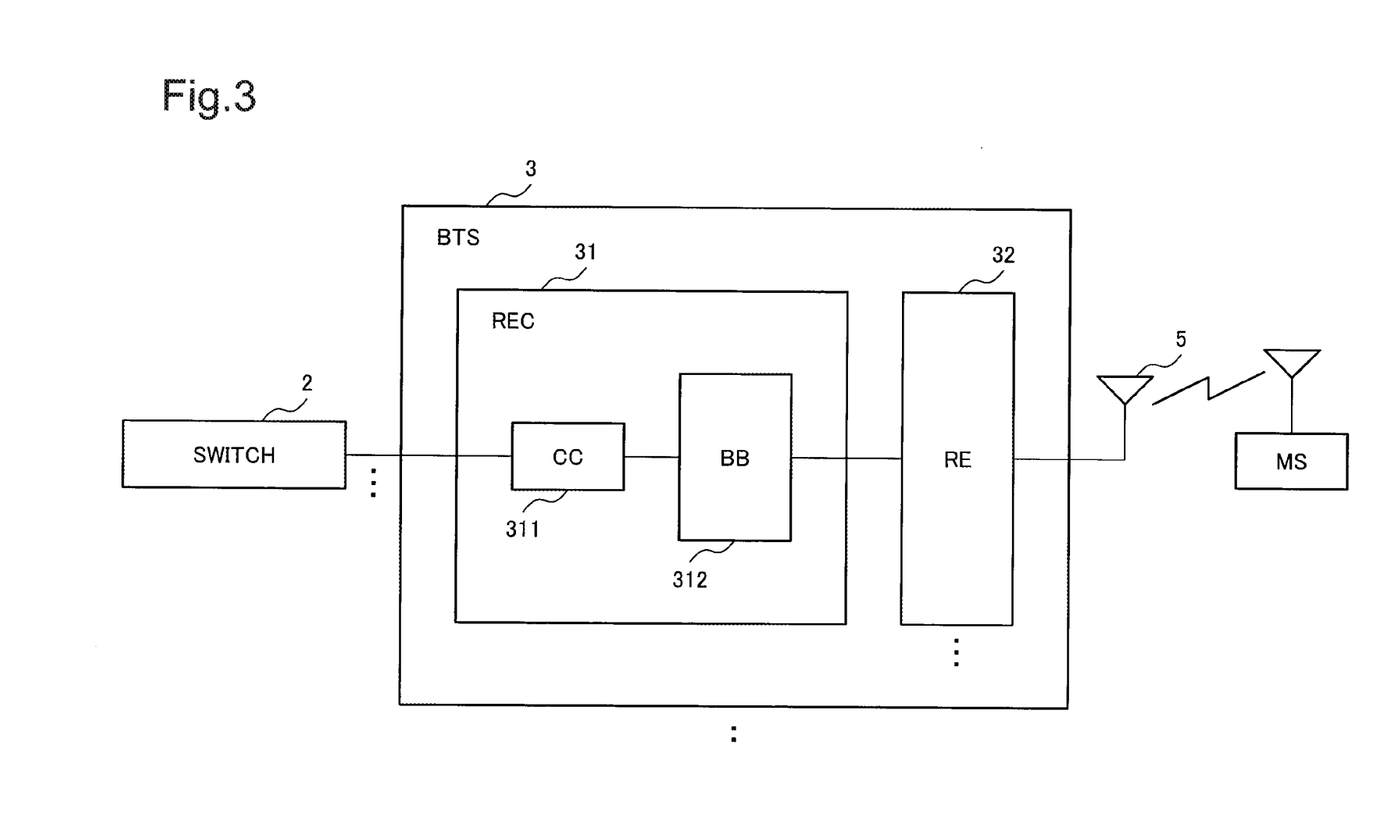
FIG. 3 is a block diagram illustrating an internal configuration of a REC 31 in FIG. 1.

First, a basic configuration prerequisite to a mobile communication system according to the present embodiment and a configuration of a BTS (Base Transceiver Station) will be described with reference to FIGS. 1, 2 and 3.

Then, a conventional service configuration will be described with reference to FIG. 4.

A configuration with characteristic of the present invention will then be described with reference to FIG. 6.

Note that a combination of symbol # with an alphabetical character or with a number in parentheses (for example "(#1)") throughout the drawings is a sign for identifying a component among a plurality of components of the same type.

Figure 1:
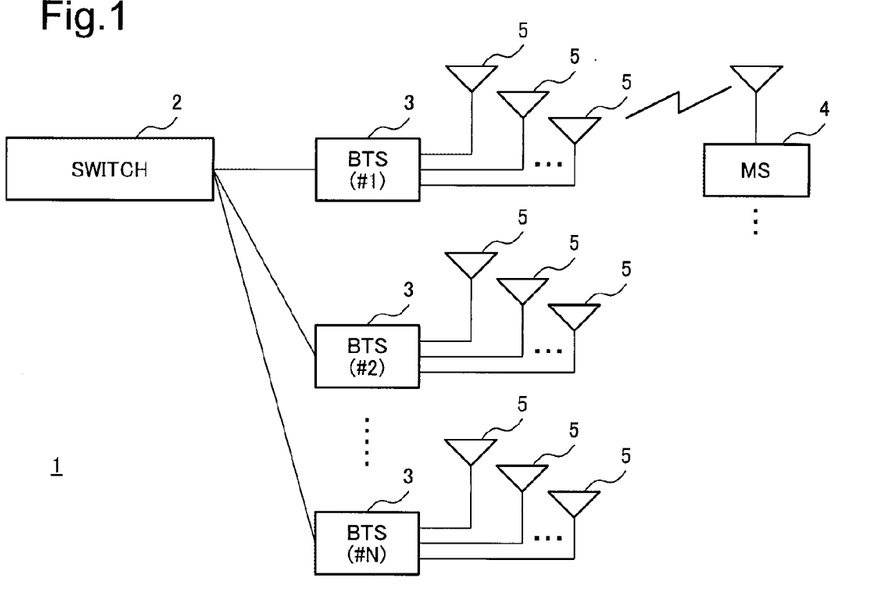
FIG. 1 is a system diagram illustrating one embodiment of the present invention.

FIG. 1 is a general view of an overall configuration of a mobile communication system 1 of the present embodiment and illustrates connections among devices in the mobile communication system 1.

The mobile communication system 1 includes a switch 2, a plurality of BTSs 3 and a plurality of mobile stations (hereinafter a mobile station is abbreviated as MS) 4.

Each BTS 3 includes a plurality of antennas 5. Here, the BTS 3 can be considered to be a configuration including a plurality of antennas 5.

The switch 2 is connected to dozens of the BTSs 3 and monitors the status of and controls the BTSs 3. The switch 2 also manages radio resources of each BTS 3, communicates with the MS 4 that communicates with the BTS 3 through the BTS 3, and also manages the MS 4 at the calling time.

An internal configuration of each BTS 3 will now be described with reference to FIG. 2.

The BTS 3 includes an REC (Radio Equipment Control: equivalent to a "radio control unit") 31 and a plurality of REs (Radio Equipment: equivalent to a "radio unit") 32.

A combination of hardware and software in the BTS 3 implements the following functions of the BTS3: the function of controlling the BTS3, the function of processing user data passing through the BTS 3, and the function of wirelessly sending data processed in the BTS 3 to the MS 4, receiving a signal wirelessly sent from the MS 4 and passing the signal to a predetermined user data processing unit. More specifically, these functions are implemented by the components described below.

A combination of hardware and software in the REC 31 implements the following functions in the REC 31: the function of controlling the BTS 3 and the function of processing user data passing through the BTS 3.

A combination of hardware and software in the RE 32 implements the following function in the RE 32: the function of wirelessly sending data processed in the BTS 3 to the MS 4, receiving a signal wirelessly sent from the MS 4 and passing the signal to a predetermined user data processing unit.

The REC 31 described with reference FIG. 2 will be described below in further detail with reference to FIG. 3.

As described above, the REC 31 includes the function of controlling the BTS 3 and the function of processing user data passing through the BTS 3. The function of controlling the BTS 3 is referred to as CC (Common Control) 311 and the function of processing user data passing through the BTS 3 is referred to as BB (Base Band resource) 312.

A basic example of installation of the REC 31 and the RE 32 will now be described with reference to FIG. 4.

A plurality of the REs 32 are connected to the REC 31 to form the BTS 3. The REC 31 and the REs 32 can be installed at a far distance from each other, such as tens of kilometers. In practice, the REC 31 and the REs 32 are often installed at a far distance from each other and are constantly connected with each other through high-speed signal lines such as optical communication lines.

Since the REs 32 connected to the same REC 31 are installed side by side each other, cells 6 associated with the REs 32 may be adjacent to each other. Here, the cell 6 (small zone) is an area in which the associated RE 32 can send and receive radio waves.

Figure 4:
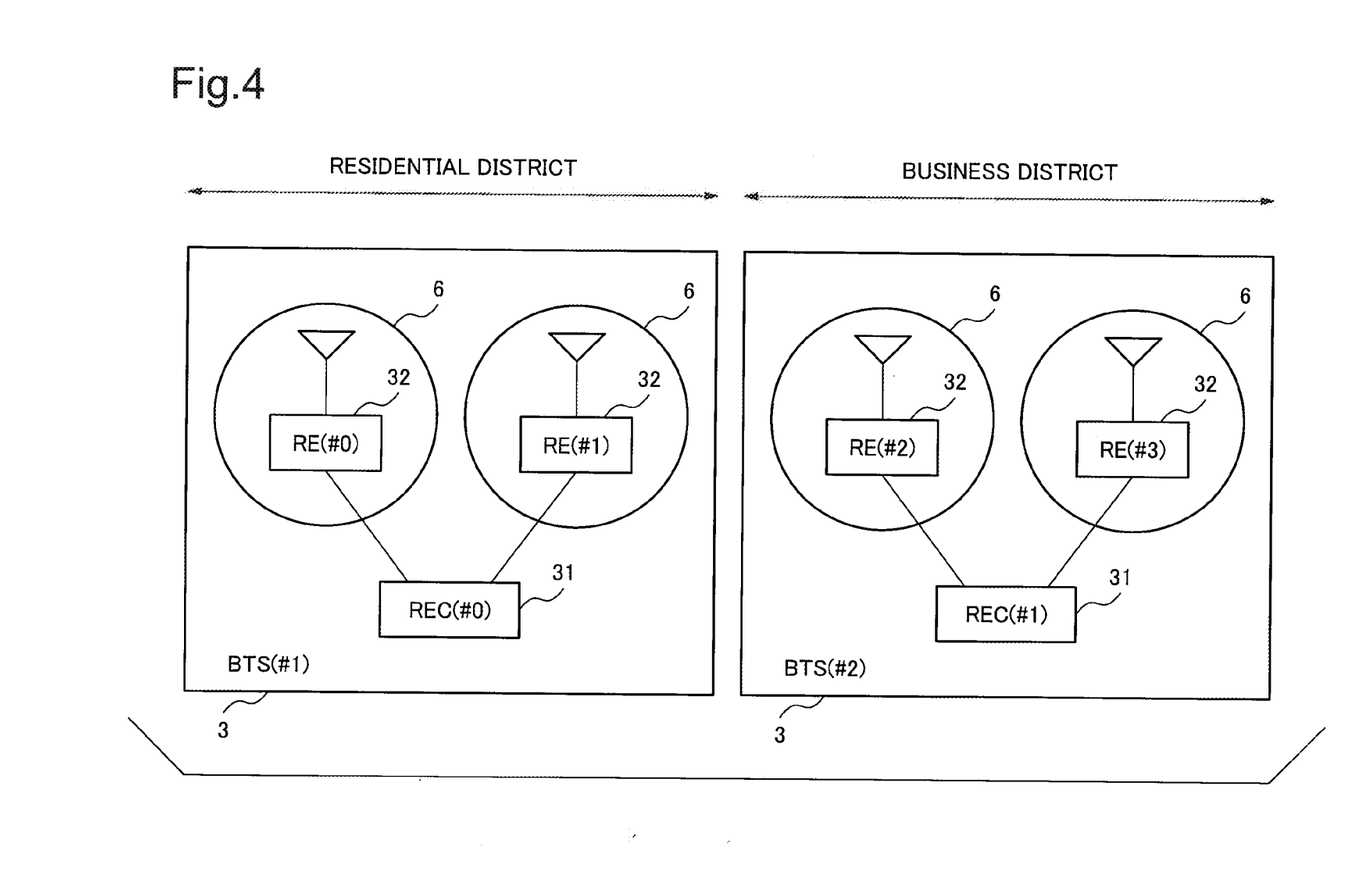
FIG. 4 is a diagram illustrating an example of connection among the REC 31 and the REs 32 in the mobile communication system 1 in FIG. 2.

In the basic example illustrated in FIG. 4, when any given RE 32 is installed in a business district, the other plurality of the REs 32 connected to the REC 31 to which the RE 32 is connected are all installed in the business district. In other words, the RE 32 (#2) and the RE 32 (#3) that are installed in the business district are both connected to the REC 31 (#1).

Similarly, when any given RE 32 is installed in a residential district, the other plurality of the REs 32 connected to the REC 31 to which the RE 32 is connected are all installed in the residential district. In other words, the RE 32 (#0) and the RE 32 (#1) that are installed in the residential district are both connected to the REC 31 (#0).

Figure 5A:
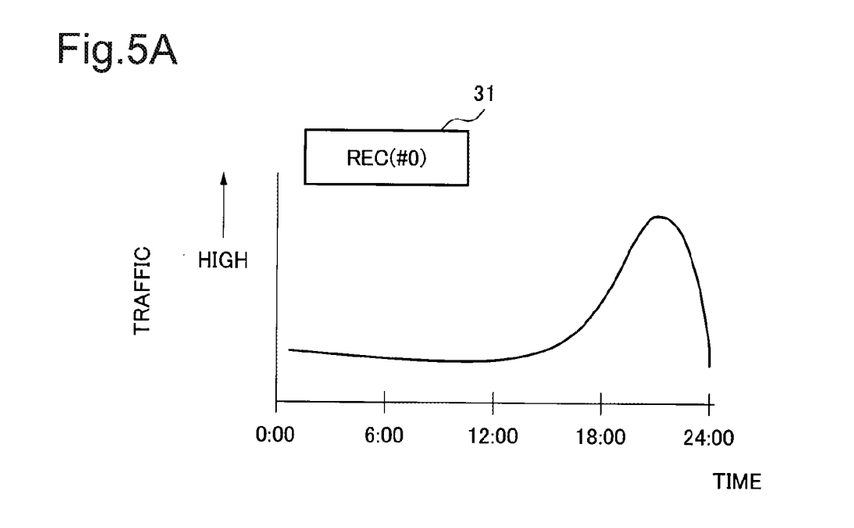
FIG. 5A is a diagram illustrating time variation of the amount of traffic on the REC 31 connected to the REs 32 installed in a residential district in the connection state of FIG. 4.
Figure 5B:
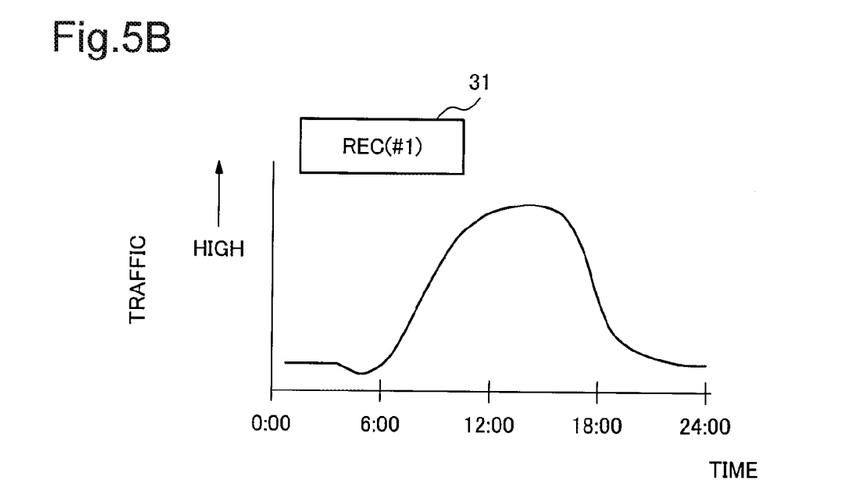
FIG. 5B is a diagram illustrating time variation of the amount of traffic on the REC 31 connected to the REs 32 installed in a business district in the connection state of FIG. 4.

FIGS. 5A and 5B illustrate an example of each time variations of traffic on the REC 31 (#0) and the REC 31 (#1) in the installation state of the REC 31 and the REs 32 illustrated in FIG. 4. FIG. 5A illustrates time variation of traffic on the REC 31 (#0) connected to the REs 32 installed in the residential district. On the other hand, FIG. 5B illustrates time variation of traffic on the REC 31 (#1) connected to the REs 32 installed in the business district.

Traffic on the REC 31 (#0) has a peak in the time period from 18:00 to 24:00. On the other hand, traffic on the REC 31 (#1) has a peak in the time period from 12:00 to 18:00. The amounts of traffic illustrated in FIGS. 5A and 5B exactly correspond to the amounts of traffic in the residential district and the business district.

Installation of the REC 31 and the RE 32 which is a feature of the present invention will now be described with reference to FIG. 6.

A plurality of the REs 32 are constantly connected to the REC 31 to form the BTS 3. The REC 31 and the REs 32 can be installed at a far distance from each other, such as tens of kilometers. As described previously, the REC 31 and the REs 32 are often installed at a far distance from each other and the REC 31 and the REs 32 are constantly connected with each other through high-speed signal lines such as optical communication lines. The installation is the same as the installation in FIG. 4 thus far.

Figure 6:
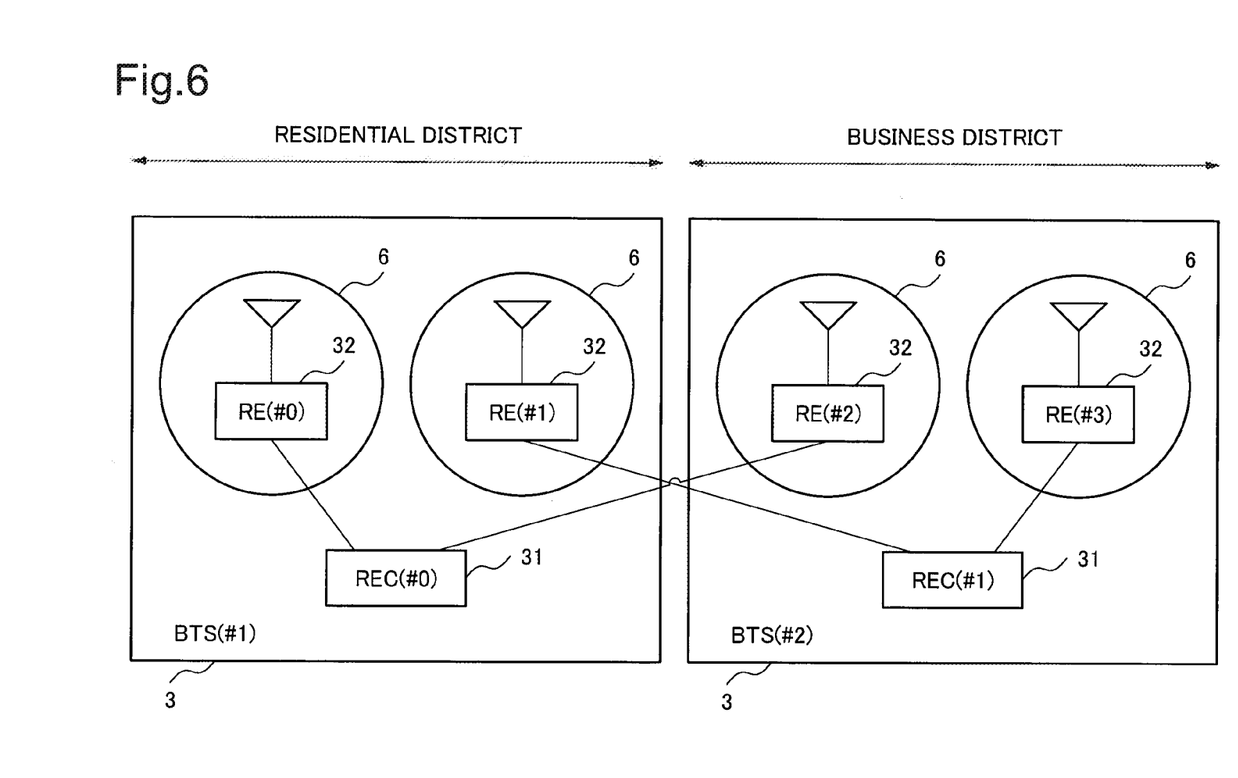
FIG. 6 is a diagram illustrating an example of connections among the REC 31 and the REs 32 in the mobile communication system 1 in FIG. 2 with characteristic of the present embodiment.

In the installation illustrated in FIG. 6, the REs 32 connected to the same REC 31 are not installed side by side, so that their cells 6 are not adjacent to each other. Furthermore, a plurality of the REs 32 connected to the same REC 31 are installed in such a way that they are evenly i.e. distributed and disposed alternately in a residential district and a business district to form the cells 6.

From the viewpoint of traffic distribution, it is desirable that the plurality of the REs 32 connected to the same REC 31 are installed to form the cells 6 so that the REs 32 serve about half of traffic peak in each of two different types of areas, such as service areas including the residential district or the business district.

However, if allocation that takes into consideration traffic is not performed, the effect of traffic distribution can be achieved to some extent simply by allocating an equal number of the REs 32 to two sets of the REC 31, for example. In other words, allocation of the equal number can be considered to be one allocation method that serves about half of traffic peak in an area.

In order to set the REC 31 to which the REs 32 are connected so that the REs 32 serve about half of the traffic peak in each area, the traffic on each RE 32 can be obtained as follows, for example.

For example, a way of allocation can be set by using actually measured values of traffic or results of simulation obtained based on past proven similar installations. Alternatively, setting may be made as described above and then the setting may be changed as appropriate based on actual performance during actual service. Note that constant connection among the REs 32 and the REC 31 through signal lines may be made through a changeover switch or the like.

In the example illustrated in FIG. 6, the RE 32 (#0) installed in the residential district and the RE 32 (#2) installed in the business district are connected to the REC 31 (#0). Additionally, the RE 32 (#1) installed in the residential district and the RE 32 (#3) installed in the business district are connected to the REC 31 (#1).

An operation in an installation characteristic of the present embodiment will now be described with reference to FIGS. 6, 7A, 7B and 8.

First, the mobile communication system 1 of the present embodiment is configured in such a way that cells 6 formed by the REs 32 connected to the same REC 31 are evenly disposed in a residentially district and a business district as illustrated in FIG. 6.

In FIG. 6, the RE 32 (#0) and the RE 32 (#2) are connected to the REC 31 (#0), the RE 32 (#0) forms the cell 6 in the residential district, and the RE 32 (#2) forms the cell 6 in the business district. On the other hand, the RE 31 (#1) and the RE 31 (#3) are connected to the REC 31 (#1), the RE 31 (#1) forms the cell 6 in the residential district, and the RE 31 (#3) forms the cell 6 in the business district.

Figure 7A:
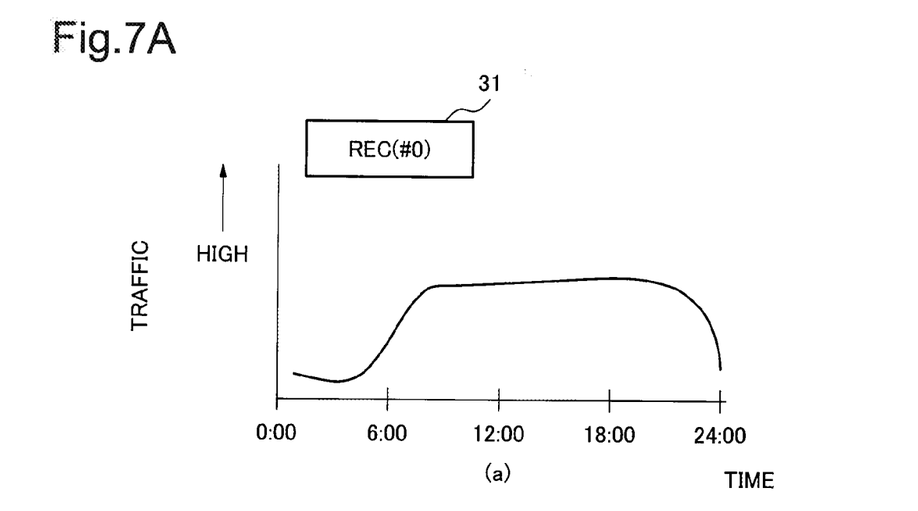
FIG. 7A is a diagram illustrating time variation of the amount of traffic on the REC 31 connected to the REs 32 installed in a residential district in the connection state of FIG. 6.
Figure 7B:
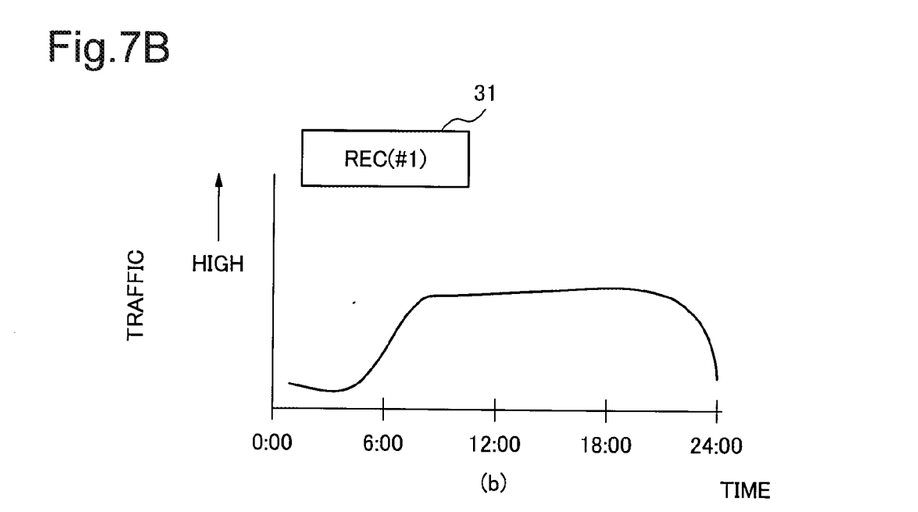
FIG. 7B is a diagram illustrating time variation of the amount of traffic on the REC 31 connected to the REs 32 installed in a business district in the connection state of FIG. 6.

FIGS. 7A and 7B illustrate the amounts of traffic on the REC 31 (#0) and the REC 31 (#1) illustrated in FIG. 6.

When the REs 32 connected to the same REC 31 are evenly installed in the residential district and the business district as illustrated in FIG. 6, the amounts of traffic on the REC 31 (#0) and the REC 31 (#1) are substantially equal.

Figure 8:
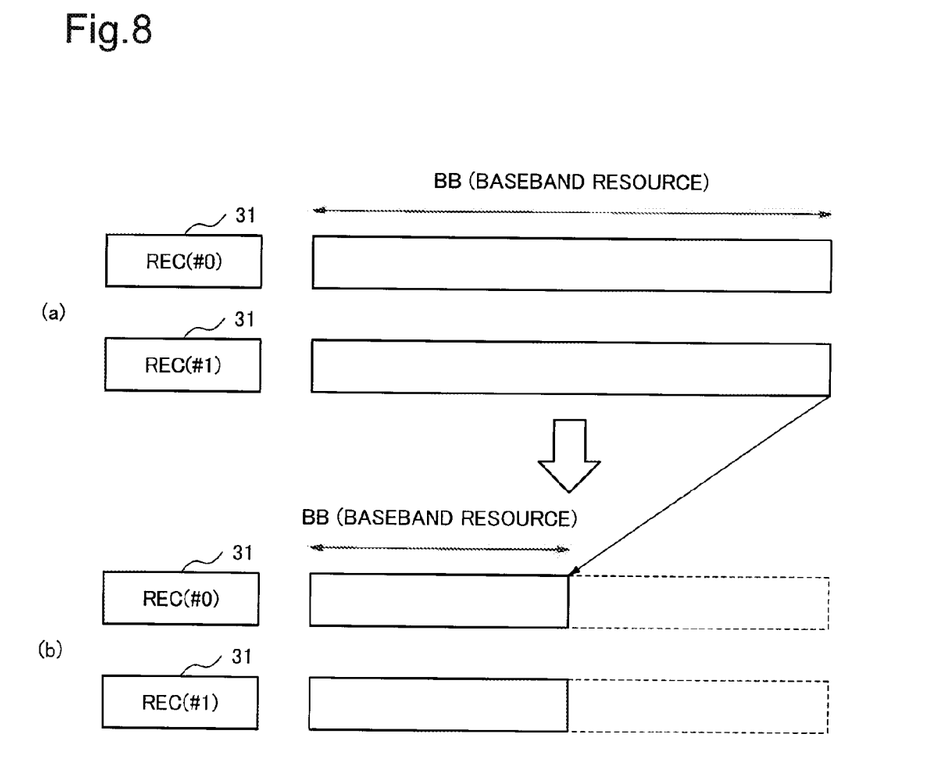
FIG. 8 is a diagram illustrating a difference in the peak of the amount of traffic between the connection states of FIG. 4 and FIG. 6.

Part (a) of FIG. 8 illustrates peak values of baseband resources (i.e. the amounts of traffic) illustrated in FIGS. 5A and 5B. Part (b) of FIG. 8, on the other hand, illustrates peak values of baseband resources (i.e. the amounts of traffic) illustrated in FIGS. 7A and 7B.

As shown in FIG. 8, the peak amounts of traffic on the REC 31 (0#) and the REC 31 (#1) in the configuration in FIG. 6 are smaller than those in the configuration in FIG. 4.

Thus, in the installation illustrated in FIG. 6 that is characteristic of the present embodiment, the amounts of traffic on both of the REC 31 (#0) and the REC 31 (#1) change from the amounts of traffic illustrated in FIGS. 5A and 5B to the amounts of traffic illustrated in FIGS. 7A and 7B, i.e. the peak amounts of traffic decrease and the frequencies of use are equalized. Accordingly, the REC 31 (#0) and the REC 31 (#1) require less baseband resources as illustrated in FIG. 8.

The present embodiment has the following advantageous effects.

A first advantageous effect is that the amount of the baseband resource implemented on the REC 31 can be reduced. This is because the REs 32 under the control of the REC 31 are evenly disposed in a residential district, where the traffic is high in the time period from evening to night, and a business district, where the traffic is high in the daytime, so that concentration of traffic on any given REC 31 in a certain time period is prevented. Specifically, the amounts of traffic illustrated in FIGS. 5A and 5B can be reduced to the amounts of traffic illustrated in FIGS. 7A and 7B.

A second advantageous effect is that in the event of failure of any given REC 31, service outage areas can be eliminated (or reduced). If the REs that are connected to any given REC are adjacent to each other, a service outage can occur in a plurality of continuous cells. In this embodiment, the REs 32 that connected to any given REC 31 are not adjacent to each other, service outages do not occur in a plurality of continuous cells.

Note that while two sets of the REs 32 are connected to the REC 31 in the embodiment described above, the same advantageous effects can be achieved in cases where three or more REs are connected to the REC 31. Furthermore, the same advantageous effects can be achieved by distributing to any given regions of the REs 32 to be connected to the same REC 31 while focusing on the amounts of traffic of each region.

As has been described, a plurality of the REs to be connected to any given REC are installed in regions where changes in the amounts of traffic according to the time of day are completely different from each other (here, a residential district and a business district) in a mobile communication system as illustrated in FIG. 6, rather than installing the REs adjacent to each other. This can increase the efficiency of use of baseband resources implemented on the REC and can minimize the baseband resources to be implemented on the REC.

Figure 9:
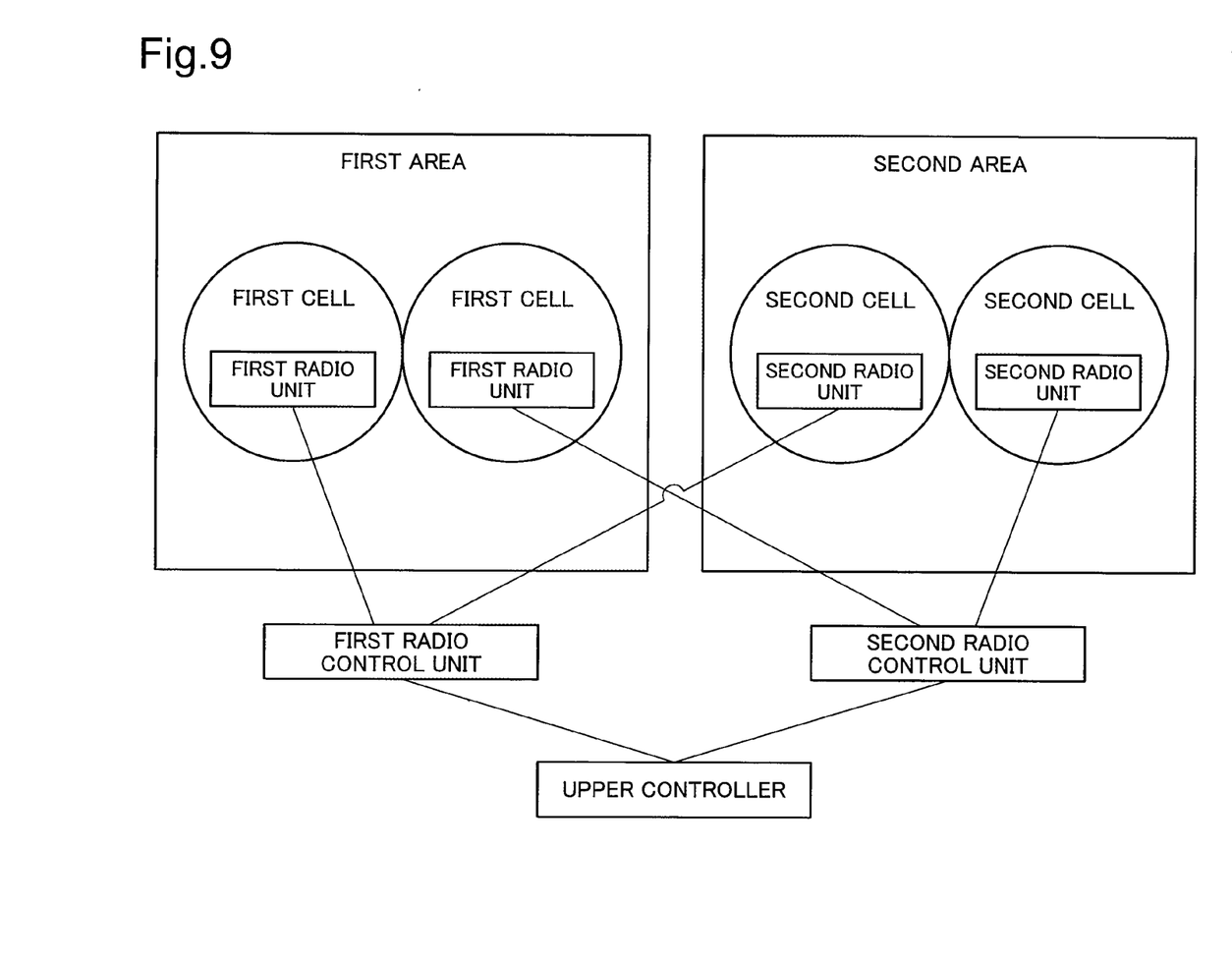
FIG. 9 is a block diagram illustrating a basic configuration of an embodiment of a mobile communication system of the present invention.

Note that a basic configuration of an embodiment of the present invention can be represented as illustrated in FIG. 9.

A mobile communication system as a basic embodiment of the present invention includes a plurality of first radio units, a plurality of second radio units, a first radio control unit, a second radio control unit, and an upper controller.

Here, the first radio units correspond to the REs 32 (#0) and (#1) in FIG. 6. The second radio units correspond to the REs 32 (#2) and (#3) in FIG. 6. The first radio control unit corresponds to the REC 31 (#0) in FIG. 6. The second radio control unit corresponds to the REC (#1) in FIG. 6. The upper controller corresponds to the switch 2 in FIG. 1.

In the configuration illustrated in FIG. 9, the plurality of first radio units are installed in a plurality of first cells that make up a first area. The plurality of second radio units are installed in a plurality of second cells that make up a second area separated from the first area.

The first radio control unit is constantly connected to a plurality of first radio units that serve about half of traffic peak in the first area and is also constantly connected to a plurality of second radio units that serve about half of traffic peak in the second area.

The second radio control unit is constantly connected to the remaining plurality of first radio units and is also constantly connected to the remaining plurality of second radio units.

The upper controller is connected to the first radio control unit and the second radio control unit.

Here, the first area or the second area corresponds to a region or service area including a residential district or a region or service area including a business district, respectively.

This application is based upon and claims the benefit of priority from Japanese patent application No. 2012-138503, filed on Jun. 20, 2012, the disclosure of which is incorporated herein in its entirety by reference.

INDUSTRIAL APPLICABILITY

According to the present invention, resources on an upper controller can be appropriately allocated by using a simple configuration even when there are differences in traffic among areas.

REFERENCE SIGNS LIST

1 . . . Mobile communication system
2 . . . Switch
3 . . . BTS
4 . . . Mobile Station (MS)
5 . . . Antenna
6 . . . Cell
31 . . . REC (Radio Equipment Control)
32 . . . RE (Radio Equipment)
311 . . . CC (Common Control)
312 . . . BB (Baseband resource)

The invention claimed is:

1. A mobile communication system comprising:
a plurality of first radio units, each being installed in a plurality of first cells making up a first area;
a plurality of second radio units, each being installed in a plurality of second cells making up a second area being separated from the first area;
a first radio control unit constantly connected to a plurality of the first radio units that serve half of traffic peak in the first area and constantly connected to a plurality of the second radio units that serve half of traffic peak in the second area;
a second radio control unit constantly connected to the remaining plurality of the first radio units and constantly connected to the remaining plurality of the second radio units; and
an upper controller connected to the first radio control unit and the second radio control unit,
wherein each of the first cells and each of the second cells are distributed and alternatively disposed, and
the plurality of the first radio units and the plurality of the second radio units are installed so that their cells are not adjacent to each other.

2. The mobile communication system according to claim 1, wherein a time period in which traffic in the first area peaks differs from a time period in which traffic peaks in the second area peaks.

3. The mobile communication system according to claim 1,
wherein each of the first cells, in which the first radio units connected to the first radio control unit are installed, and each of the first cells, in which the first radio units connected to the second radio control unit, are installed, are distributed and alternately disposed; and
each of the second cells, in which the second radio units connected to the first radio control unit are installed, and each of the second cells, in which the second radio units connected to the second radio control unit are installed, are distributed and alternately disposed.

4. A mobile communication method comprising:
installing each of a plurality of first radio units in a plurality of first cells making up a first area;
installing each of a plurality of second radio units in a plurality of second cells making up a second area being separated from the first area;
enabling a first radio control unit to be constantly connected to a plurality of the first radio units that serve half of traffic peak in the first area and to be constantly connected to a plurality of the second radio units that serve half of traffic peak in the second area;
enabling a second radio control unit to be constantly connected to the remaining plurality of the first radio units and to be constantly connected to the remaining plurality of the second radio units; and
connecting an upper controller to the first radio control unit and the second radio control unit,
wherein each of the first cells and each of the second cells are distributed and alternatively disposed, and
the plurality of the first radio units and the plurality of the second radio units are installed so that their cells are not adjacent to each other.

* * * * *